Aug. 25, 1964    EIJI OTSUKA    3,146,263
TREATMENT OF UREA SYNTHESIS EFFLUENT LIQUOR
Filed Aug. 13, 1959    3 Sheets-Sheet 1

INVENTOR.
Eiji Otsuka
BY
ATTORNEYS

Aug. 25, 1964  EIJI OTSUKA  3,146,263
TREATMENT OF UREA SYNTHESIS EFFLUENT LIQUOR
Filed Aug. 13, 1959  3 Sheets-Sheet 2

INVENTOR.
Eiji Otsuka
BY
Blum Moscovitz Friedman &Blum
ATTORNEYS

Aug. 25, 1964     EIJI OTSUKA     3,146,263
TREATMENT OF UREA SYNTHESIS EFFLUENT LIQUOR
Filed Aug. 13, 1959     3 Sheets-Sheet 3

INVENTOR.
Eiji Otsuka
BY
ATTORNEYS

United States Patent Office 3,146,263
Patented Aug. 25, 1964

3,146,263
TREATMENT OF UREA SYNTHESIS EFFLUENT LIQUOR
Eiji Otsuka, Fujisawa, Kanagawa Prefecture, Japan, assignor to Toyo Koatsu Industries, Incorporated, Tokyo, Japan, a corporation of Japan
Filed Aug. 13, 1959, Ser. No. 833,631
Claims priority, application Japan July 3, 1959
17 Claims. (Cl. 260—555)

This invention relates to a method of synthetizing urea and it has particular relation to a urea synthesis in which the unreacted $NH_3$ and $CO_2$ are practically completely recovered from the urea synthesis melt and are reused in the urea synthesis by recycling.

It has been well known that the conversion of $CO_2$ and $NH_3$ into urea can be increased by using an excess of $NH_3$ in the synthesis. It has been also known to recover from the urea melt formed in the synthesis excess ammonia by reducing the pressure on the urea melt to about 10–20 atmospheres whereby unreacted $NH_3$ is separated from the melt and can be reintroduced into the urea synthesis after removal of $CO_2$ therefrom and condensation to liquid ammonia. However, in this known procedure only a part of the uncombined ammonia is recovered so that the urea melt still contains part of the uncombined excess ammonia.

In carrying out the method of this invention, urea melt formed in the course of urea synthesis from $CO_2$ and excess ammonia at high temperature and under high pressure, is treated to recover therefrom urea product, and $NH_3$ and $CO_2$ values for reuse in the synthesis. To this end the melt is subjected to rectification under a pressure in the range of 10–30 kg./cm.$^2$ whereby uncombined $NH_3$ is distilled off from the melt, is separated from uncombined $CO_2$ present therein, and then liquefied for reuse in the urea synthesis. After its rectification, the urea melt or solution, which still contains uncombined $NH_3$ and $CO_2$, is treated in a "concentrator" at elevated temperature and under pressure with a carrier gas as described further below, which is passed through the concentrator in order to remove water from the urea melt and is passed to a dehumidfier in order to separate water from it so that it can be reused after dehumidification. The urea melt discharged from the concentrator is caused by cooling to crystallize and the urea crystals are separated from the mother liquor. The latter is used for the removal of $CO_2$ from the $NH_3$ recovered in the rectification of the urea melt, then for the absorption of $NH_3$ and $CO_2$ evolved from the urea melt during its rectification and is finally introduced as a recycle into the urea synthesis, together with fresh $NH_3$ and $CO_2$ in amounts suitable for maintaining the desided $CO_2/NH_3$ porportion in the urea synthesis.

The above steps or procedures will now be explained in detail by way of example in the following description and in the appended drawings, in which FIGURE 1 is the diagrammatic illustration of a rectifying tower and FIGURE 2 of a combination system of concentration and dehumidification, used in carrying out the invention;

FIGURE 3 is the diagrammatic illustration of a system for carrying out the method of the invention, while

By measuring the liquid-gas equilibrium in the urea-$NH_3$—$CO_2$—$H_2O$ four component system, it has been found that the recovery of excess ammonia in the urea synthesis can be improved in the following manner.

It has been found that the relation between the mol ratio $NH_3/CO_2=x$ in the liquid phase and the mol ratio $NH_3/CO_2=y$ in the gas phase can be expressed by the following approximate equations:

Total pressure:               Equation
   At 10 atmospheres pressure____ $y=0.1345 \times 10^{0.92x}$
   At 15 atmospheres pressure____ $y=0.0046 \times 10^{1.005x}$
   At 20 atmospheres pressure____ $y=0.043 \times 10^{0.668x}$ It has been further found that the $NH_3$ can be rectified up to the azeotropic point, as illustrated in the following data:

| Total pressure | Azeotrope ($x$) | Azeotropic temperature |
|---|---|---|
| 10 atm. pressure | 2.47 | 111 |
| 15 atm. pressure | 2.77 | 121 |
| 20 atm. pressure | 2.95 | 129 |

Figure 1:
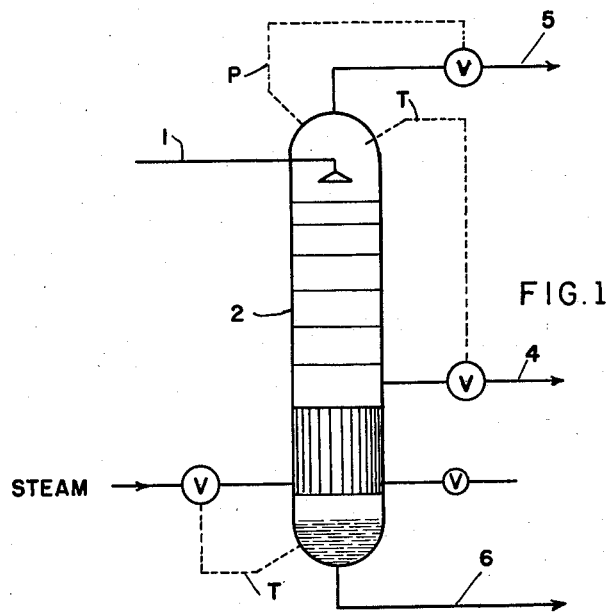

Favourable results have been obtained by using the rectifying arrangement shown in FIG. 1, in which the dotted lines leading from the representation "V" of valves, indicate, respectively, pressure and temperature controls for the rectifier. In this arrangement urea synthesis liquor withdrawn from the urea synthesis autoclave is introduced through 1 into the rectification tower 2 in which it is heated to 130°–160° C. at the bottom 3, whereby gaseous $NH_3$ and $CO_2$ are evolved. Part of the evolved gases is used in the rectification so as to maintain the temperature in the top part of the tower at 90°–110° C., while the major portion of these gases is withdrawn at 4. The withdrawn gas has a favourable $NH_3/CO_2$ mol ratio of 2.5–3.5 and is used in the absorption tower to be explained here further below. The rectification tower is operated at a pressure in the range of 10 to 30 atmospheres which can be adjusted based on the condensation pressure of the excess $NH_3$ from the top part 5 and on the operating pressure of the absorption tower to the which the $NH_3+CO_2$ gases from the middle or the bottom part 4, of the tower are subjected. The amount of gases to be withdrawn at 4 is controlled in dependence on the temperature at the top of the tower the $CO_2$ present in the $NH_3$ which constitutes a major component of the exit gas at the top, is a function of said temperature and, therefore, only an amount of gas for rectification, which is necessary for the recovery of excess $NH_3$ is passed up to the top of the tower and the remaining major portion is withdrawn at 4 so that the top part of the tower may be kept at an appropriate temperature of 90–110° C. The excess $NH_3$ escaping at the top of the tower contains about 0.5% $CO_2$ (by volume) which must be removed by scrubbing with mother liquor, as described further below. The removal of $CO_2$ from the ammonia is necessary, because $NH_3$ in which $CO_2$ is present, is not suitable for condensation. Such $CO_2$ would react with $NH_3$ during condensation with the formation of ammonium carbamate which would clog the piping system of the condenser.

Figure 2:
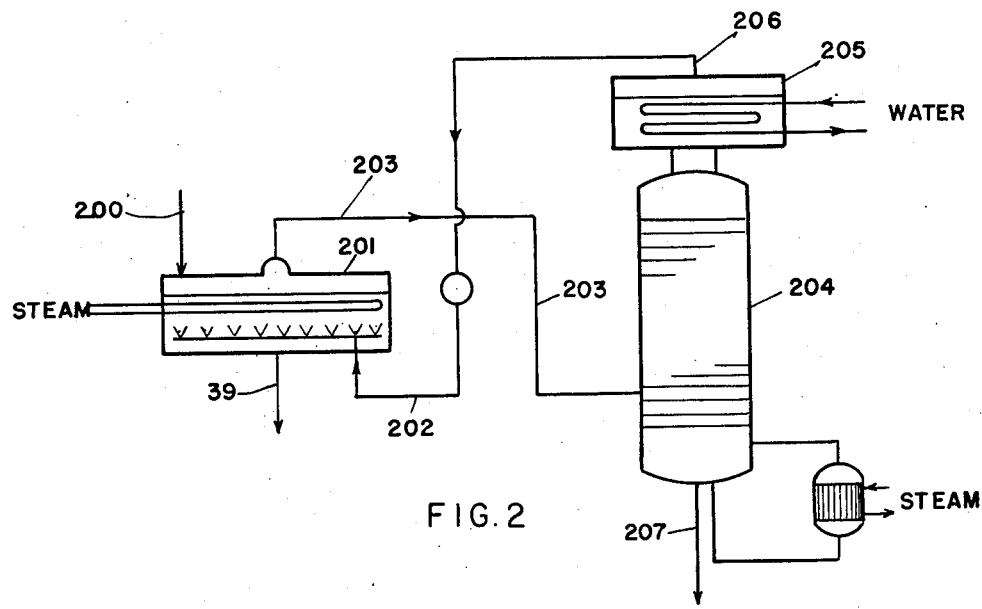

The urea solution containing undistilled $NH_3$ and $CO_2$ and discharged from the high-pressure rectification tower at 6 (see FIG. 1) is subjected to further concentration in the apparatus shown in FIG. 2 by the following procedure.

The concentrator 201 is maintained at 70–150° C. and 1–8 atmospheres pressure. Into this concentrator the beforementioned urea solution is introduced at 200 and either $NH_3$ gas, or a gaseous mixture of $NH_3$ and $CO_2$ gas, or $CO_2$ gas (which are referred to hereinafter as "carrier gas") is blown at 202. By the action of this carrier gas on said urea solution substantially only water is withdrawn from the concentrator at 203, without the water being accompanied by $NH_3$, $NH_3$ plus $CO_2$, or $CO_2$. The amount of water withdrawn corresponds generally to that formed in the urea synthetizing reaction.

The carrier gas used in the concentration process can be used again by removing its water content through dehumidification as described here further below. Thus, a combination of concentration and dehumidification is used for the removal of water.

In the concentration process the urea solution containing the residual unreacted $NH_3$ and $CO_2$ is treated at a lower temperature and pressure than in the high pressure rectification process. The operating pressure in the concentrator is preferably the equilibrium pressure to which the solution from the rectification process is subjected at the operating temperature in the concentrator. The carrier gas is selected as a mixed gas of $NH_3$ and $CO_2$ with the same $NH_3/CO_2$ mol ratio as in the gas phase which is in equilibrium with the liquid phase (subjected to the operating pressure and temperature in the concentrator) introduced from the high pressure rectification process, whereby the carrier gas removes only water without removing unreacted $NH_3$ and $CO_2$.

Actually even if either $NH_3$ or $CO_2$ is used as a carrier gas, it becomes converted into a mixed gas with the above mentioned $NH_3/CO_2$ mol ratio in equilibrium in the circulating system. It is thereby of advantage to maintain the unreacted $NH_3$ and $CO_2$ in the liquid phase in the concentration step. This results in considerably more advantageous steam economy, in comparison with distilling and then again liquefying them, because they are bound to be recycled as a solution through the autoclave.

In the concentration process the water content necessary for recirculation in form of a solution is kept in the liquid phase. This is more advantageous also with regard to steam economy than prior procedures, in which water necessary for recycling is made up in the recycle system.

Reference should be made to the dehumidification process which reduces the water content, as much as possible, in the carrier gas—which may be a gaseous mixture of $NH_3$ and $H_2O$; or a gaseous mixture of $NH_3$, $CO_2$ and $H_2O$; or a gaseous mixture of $CO_2$ and $H_2O$—which was used for removing water in the concentrator.

The process of this invention constitutes a total recycling system of unreacted substances so that mainly the water formed by urea synthesis must be removed. This is done in the dehumidifying procedure.

By measurements of the liquid-gas equilibrium in the $NH_3$—$CO_2$—$H_2O$ system, the following has been found:

In a test in which the $NH_3/CO_2$ mol ratio in the gas phase is fixed at a definite value (1) At a constant pressure the low temperature gas phase is rich in $NH_3+CO_2$. Upon increasing the temperature, the $NH_3$ and $CO_2$ content gradually decreases, while the water content considerably increases. This shows that rectification can be carried out comparatively easily;

(2) At a constant temperature the concentration of $NH_3+CO_2$ in the gas phase increases in accordance with the increase in pressure;

(3) In the liquid phase the concentration of $NH_3+CO_2$ naturally increases when the temperature is reduced and the pressure is increased; the $NH_3/CO_2$ mol ratio becomes larger as the temperature is increased and becomes lower as the temperature is reduced. In the latter case the solution approaches an ammonium carbonate composition.

The dehumidification process based on these observations will now be described in connexion with the appended FIG. 2.

A mixed gas of $NH_3+CO_2$ containing 50–70% water (by weight) is introduced through 203 into a dehumidification tower 204 (FIG. 2). In keeping the temperature of the condenser 205 at the top of the tower 204, at 70–90° C. and the temperature of the liquid at the bottom of the tower at the boiling temperature of water under the operating pressure, the whole content of the $NH_3+CO_2$ in the mixed gas charged into the tower 204 can be recovered through the conduit 206, while the water content of the mixed gas is removed from it to such an extent that after such removal the gas has a water content in the range of 3–10% by weight. The water thus removed is withdrawn at the bottom of the tower through conduit 207 and contains substantially no $NH_3$ and $CO_2$. This shows that the water content has been almost entirely removed by said treatment.

Tests have shown that in order to lower the water content of the mixed exit gas (206) an increase of the pressure and reduction of the temperature, to which it is subjected, is necessary, whereby, however, the temperature inside the condenser should not be lowered below 70° C., in order to avoid the separation of solid ammonium carbonate from the gas phase in said exit gas. The exit gas which is either $NH_3$ or $CO_2$ or a mixture of $NH_3$ and $CO_2$, contains 3–10% water and is then used again as carrier gas in the above described concentration process.

The urea solution which contains $NH_3$ and $CO_2$ and from which the water formed by the urea synthetizing reaction has been removed, is cooled to 20°–100° C. and subjected to crystallization, whereby only urea crystals are formed without the deposition of carbamate crystals. These urea crystals are separated from the mother liquor and form a final product. In this instance, the mother liquor is caused to absorb $CO_2$ from excess $NH_3$ from the top of the high pressure rectification tower and then the distilled gas mixture withdrawn from the middle or bottom part of the high pressure rectification tower, whereby the unreacted $NH_3$ and $CO_2$ are completely recovered and said liquor is then recycled to the synthetizing autoclave. In this absorption a temperature of 80°–140° C. and a pressure of 10–40 atmospheres are most favourably applied, whereby the unreacted $NH_3$ and $CO_2$ can be completely recovered in a state of low water content. If it becomes necessary to use in the absorption process a pressure which is higher than the pressure used in the high pressure rectification, the pressure of the exit gas from the middle or bottom part of the rectification tower may be increased by a compressor.

In studying the absorption process it has been found that in the four component system of $NH_3$—$CO_2$-urea-$H_2O$ the amount of $CO_2$ which dissolves is an aqueous urea solution having a certain urea and $H_2O$ content under the same temperature and pressure, reaches a maximum value when the gas mixture to be absorbed has an appropriate $NH_3/CO_2$ composition of 2.5–3.5 stated hereinafter, whereby the solubility is expressed by the amount of $CO_2$ dissolved in the urea solution as a solvent, due to a complete recovery of the unreacted $NH_3$ plus $CO_2$. For example at 15 kg./cm.$^2$ and 115° C., the amount of dissolution reaches a maximum value at $NH_3/CO_2=2.9$. As to the absorption conditions, the pressure should be suitably higher, but the temperature must be selected appropriately in the light of absorption capacity and formation of carbamate. Thus, the mol ratio $NH_3/CO_2$ in the absorbed gas and a suitable absorption temperature must be selected in order to obtain maximum absorption of the unreacted $NH_3$ plus $CO_2$ against urea plus $H_2O$.

In carrying out the present invention, a combination of a high pressure rectification tower having a construction capable of appropriately controlling the $NH_3/CO_2$ mol ratio of the gas to be absorbed, with an absorption tower is used, the temperature of which can be adjusted to a suitable absorption temperature, whereby the pressure may be the same or higher than that to which the rectification tower is subjected. The economic advantages are thus increased by carrying out said absorption with the smallest amount of solvent under a definite pressure, or with the lowest pressure while using a definite amount of solvent.

In developing the present invention it has been further found that it is a most advantageous procedure, in the light of economy and phase rule, to recycle part of the unreacted $NH_3$ and $CO_2$ and to recycle water in the form of mother liquor without distilling off the $NH_3$ and $CO_2$, while according to the hitherto-known methods, urea is obtained from urea synthesis liquor, whereby the unreacted $NH_3$ and $CO_2$ as well as the water formed by the urea synthesis are driven off. This procedure requires a considerable amount of steam for heating. Obviously, the best way would be to cool the urea synthesis liquor directly, wherby only the crystal urea content would be taken out and to recycle the mother liquor (from which the water formed has been driven off) to the synthesis autoclave. As it is, solubility in the four component system, urea-$H_2O$—$NH_3$—$CO_2$, does not permit such procedure. In cooling the urea synthesis liquor, or the urea synthesis liquor freed from excess ammonia, in order to obtain urea crystals, usually only crystalline carbamate or mixed crystals of carbamate and urea are formed. However, it has been found that urea crystals can be obtained, depending upon the conversion efficiency, in accordance with solubility in the carbamate-urea-$H_2O$ system as explained in the following:

In the case of a urea synthesis under the condition of $NH_3/CO_2$ mol ratio being 3/1, the rate of conversion to urea will be about 55%. Conditions about the autoclave are shown as follows:

| (Mol) | (Urea melt) | |
|---|---|---|
| | (Mol) | (Weight) |
| $NH_3$ 3 \ autoclave ⟶ $CO_2$ 1 / | Urea 0.55<br>$NH_3$ 1.90<br>$CO_2$ 0.45<br>$H_2O$ 0.55 | 33.0<br>32.4<br>19.8<br>9.9 |

Subtracting the excess part of $NH_3$, the above figures will be as follows:

| | (Urea melt) | | |
|---|---|---|---|
| | (Mol) | (Weight) | |
| Urea | 0.55 | 33.0 | (42.3%) |
| $NH_3$ | 0.90 | 15.4 | |
| $CO_2$ | 0.45 | 19.8 | |
| $H_2O$ | 0.55 | 9.9 | (12.6%) |

Figure 5:
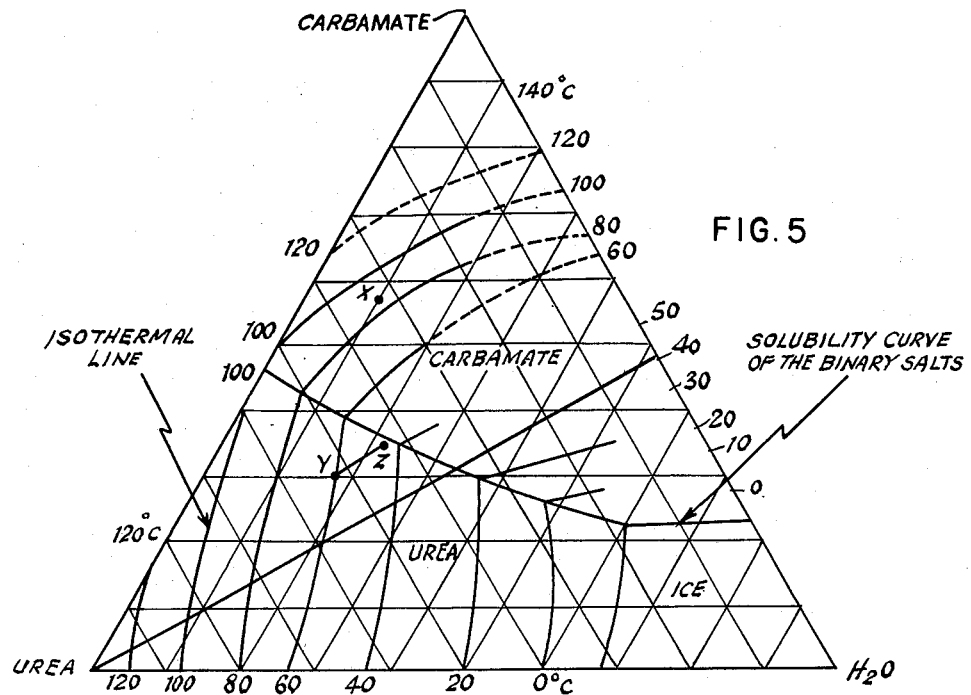
FIGURES 5 and 6 shows diagrams of solubility in the urea-$H_2O$-carbamate three component system.

Referring to FIG. 5 attached, any solution which has a certain composition of carbamate, urea and ice, and duly represented by a point inside the triangle, will precipitate carbamate or urea or ice, according to the region where the point belongs. To exemplify, the solution comprising said composition is represented as point X and will precipitate carbamate as the temperature is lowered, because the point X belongs to the region of carbamate. In another case, the solution resulting from the urea melt which has been formed by a high rate of conversion as is seen in the Example 1 to be further mentioned below and from which excess $NH_3$ has been removed, is represented as point Y. When this solution is cooled, the composition will change from Y up to Z. On further cooling, a mixed crystal of urea and carbamate will be obtained, which is less significant from industrial application. Therefore, cooling should not go beyond this point and the solution represented by Z should be recycled to the autoclave if the total recycle method is to be adopted. But in this solution, the concentration of equilibrium in urea synthetizing. This leads to the consequently a larger amount of solution would have to be recycled, which is not favourable viewed in the light of equilibrium in urea synthesizing. This leads to the conclusion that a mere treatment of separation by means of crystallization of the solution does by no means result in obtaining a concentrated recycling solution, and also that an absorption process and subsequently a distillation process are inevitable for obtaining a concentrated one.

Figure 6:
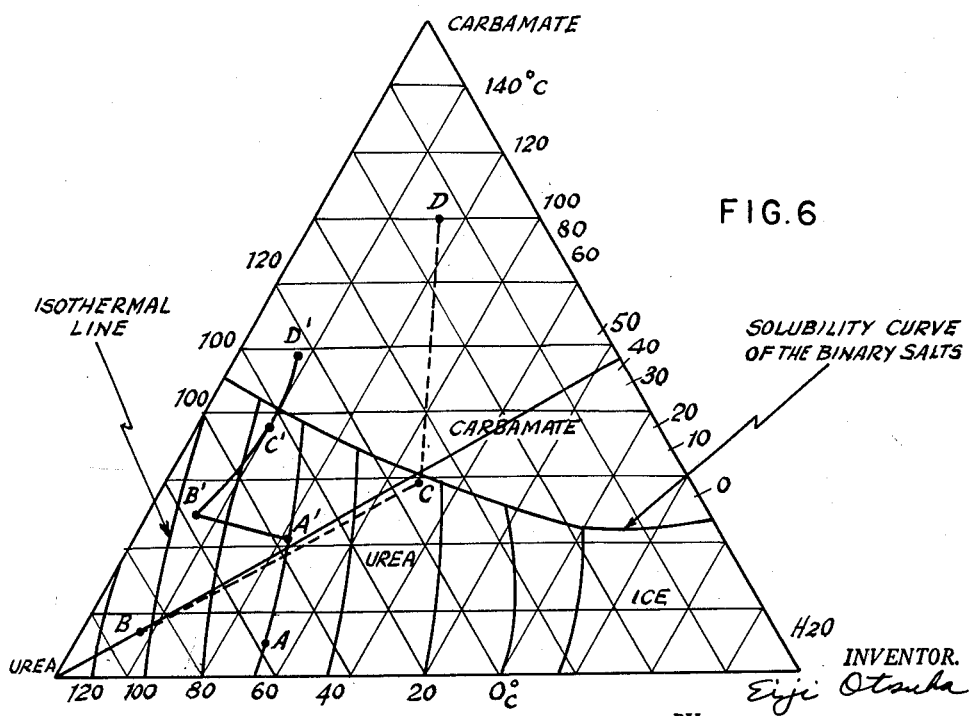

Now, referring to FIG. 6 attached, reason why the rate of distillation is specified to above 65% which constitutes an advantage of this invention is mentioned in the following. In order to obtain a concentrated solution, the A–B–C–D line in the figure must be followed. In the figure the respective points in both lines demonstrate as follows.

|  | (Points) |
|---|---|
| The solution rectification-treated | A, A' |
| The solution concentration-treated | B, B' |
| The solution crystal separation-treated | C, C' |
| The solution absorption-treated | D, D' |

The A'–B'–C'–D' line and the A–B–C–D line represent the minimum and maximum distillation rate respectively. In the case of the A'–B'–C'–D' line only a dilute solution represented by point D' can be obtained, but in the case of the A–B–C–D line a condensed solution represented by point D can be obtained. Namely, the former case has a merit of leaving the carbamate undistilled, and the latter of obtaining the condensed solution. The distillation rate of about 65% has been calculated in the present invention by taking these merits into consideration from economical study. Consequently, even in the best case, a major portion of the mother liquor must be recirculated to the autoclave and this is rather uneconomical with regard to heat balance and synthetizing capacity. From the point of view of phase rule, the present invention contemplates to distil over about half of the unreacted $NH_3$ and $CO_2$, especially over 65% of unreacted $CO_2$, in the high pressure rectification tower and to keep the remaining unreacted $NH_3$ plus $CO_2$ and part of the water formed in the recycling mother liquor to such an extent, at which the amount of recycling mother liquor is reduced as much as possible.

The advantages of the method of recycling urea synthesis according to the present invention will now be described in connexion with the appended FIG. 3.

In synthetizing urea from $CO_2$ and excess $NH_3$ in an autoclave under appropriate synthetizing temperature and pressure, the conversion rate cannot be expected to reach 100%, in view of the chemical equilibrium occurring between the starting materials and the reaction products formed in this synthesis. The urea formed by synthesis contains excess $NH_3$, unreacted $NH_3$ plus $CO_2$ and water which has been formed in the synthesis reaction. In carrying out the present invention, the so-called urea synthesis liquor is introduced from the synthesis autoclave 31 (FIG. 3) into the high pressure rectification tower 32, in which a major portion of the $NH_3$ can be recovered at the top of tower 32. The $NH_3$ gas (which contains a slight amount of $CO_2$) recovered in 32 is conducted into the upper part of the absorption tower 33 (which functions as a scrubber) and the $CO_2$ present in the $NH_3$ gas thus introduced into the upper part of 33 is removed from the $NH_3$ gas by washing or scrubbing it with mother liquor introduced into 33 at 34. The $NH_3$ gas thus freed from $CO_2$, is condensed to liquid $NH_3$ which is passed to recycling at 35. The mother liquor which contains ammonium carbonate in aqueous solution is further utilized for absorbing high pressure rectified gas withdrawn from the middle or bottom part of the high pressure rectification tower 32 and passed into the absorption tower 33 at 36. A gas mixture having a $NH_3/CO_2$ mol ratio of 2.5–3.5 is withdrawn from the middle or bottom part of the high pressure rectification tower 32 at 36, and made to an absorbed gas in tower 33. This combination of the rectification and absorption processes contributes to making the absorption pressure and/or the amount of recycling mother liquor as small as possible.

Reference has been made herein to a combination of the rectification and concentration processes. Naturally, the $NH_3/CO_2$ mol ratio in the urea synthesis liquor, from which excess $NH_3$ has been withdrawn by the rectification process, becomes rather small, and this fact has effects in the subsequent concentration process. It is highly desirable that the concentration process be operated at lower temperatures and pressures than the rectification process in reducing the carrier gas (the $NH_3$, or mixed $NH_3$ plus $CO_2$, or $CO_2$) contents necessary for carrying away the $H_2O$ content as little as possible. It has been found that assuming a fixed figure for the $NH_3$ plus $CO_2$/urea plus $H_2O$, and for the $H_2O$/urea, the pressure in the $$urea-NH_3-CO_2-H_2O$$

four component system becomes a minimum at the following $NH_3/CO_2$ mol ratio in liquid phase at the respective specific temperatures indicated:

| °C | 20 | 40 | 60 | 80 | 100 | 110 | 120 | 130 |
|---|---|---|---|---|---|---|---|---|
| $NH_3/CO_2$ mol ratio | 1.98 | 2.03 | 2.08 | 2.15 | 2.30 | 2.45 | 2.72 | 3.02 |

The situation shown by the above figures represents a general tendency.

The concentrator 201 (FIG. 2) is operated under a low pressure and at 70°–150° C. in order to cause distilling off of the water content to a satisfactory extent. It is desirable that the $NH_3/CO_2$ mol ratio in the liquid phase be selected from the figures stated in the above table. Rectification in the tower 32 with making the $NH_3/CO_2$ mol ratio as small as possible leads to a lessening in operating pressure in the concentrator 201 and in the amount of carrier gas which has to be blown in order to take off the water content.

The combination of the concentrating and dehumidifying processes has already been explained above. The dehumidifying process is used exclusively where the water formed in the synthesizing system is withdrawn. This combination is a novel and original arrangement according to the present invention and this arrangement has important economic advantages in the urea synthesis of the recycle type.

The process of the present invention shows, among others, the following principal characteristics.

(1) In view of the load imposed upon the autoclave and to prevent lowering of the synthesizing rate, the mother liquor is minimized in recirculating quantity.

(2) The unreacted $NH_3$ and $CO_2$ contents are not distilled as much as possible, only the water content being withdrawn from the concentrator in order to improve utilization of the steam in the recycling system.

(3) The conditions based on the phase rule are selected in order to prevent co-crystallization of carbamate in the crystallized urea.

These three items are related with each other in such manner that the most favourable effects in connexion with the phase rule and economy are obtained.

(4) In the recycling system, the water necessary for recycling is recycled exclusively in the form of mother liquor, because new making-up of water would mean removal of water from the recycling system.

It is also a characteristic of the present invention to lessen as much as possible the amount of solvent in the absorbing liquor, in view of which, it is desirable to limit the $NH_3CO_2$ mol ratio in the recycling solution to 2–4. The synthetized liquor should be of such composition that the mol ratio in the unreacted $NH_3/CO_2$ mixture leaving the autoclave is in the range of 2–4. After being subjected merely to high pressure distillation without high pressure rectification, the urea synthesis liquor is applied to the recycling method of the invention. The $NH_3/CO_2$ ratio of the $NH_3$ and $CO_2$, which are conducted into the autoclave is equivalent to 2:1 to 3:1, as will be explained in Example 2, further below. In this manner, any synthetizing method, the $NH_3:CO_2$ ratio of which is in the range of 2:1 to 6:1 can be carried out.

Figure 3:
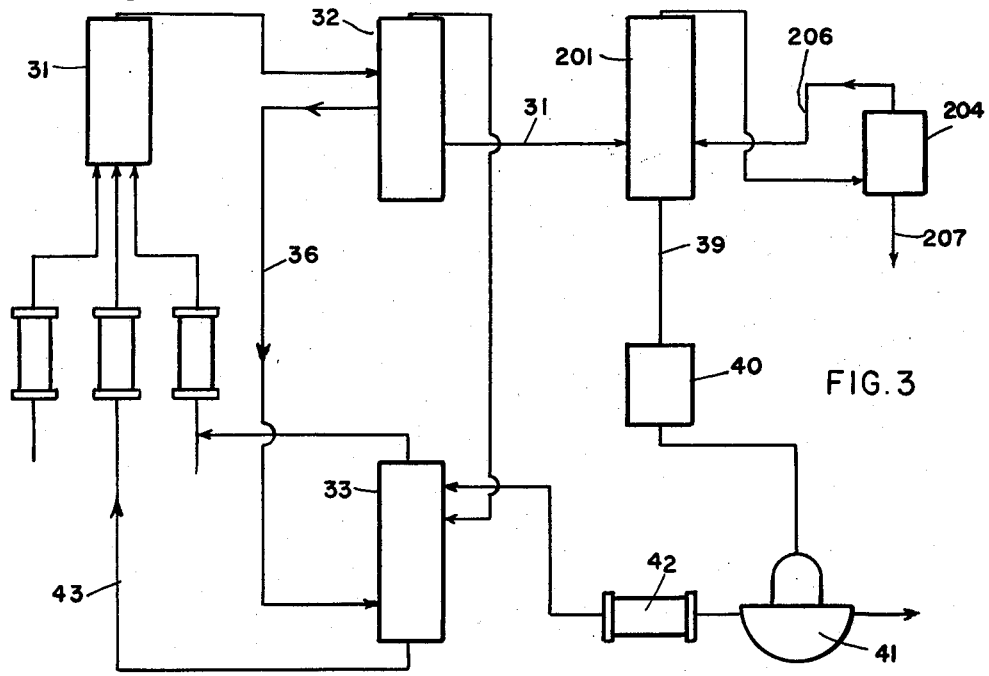

*Example 1.—Procedure in the System According to FIG. 3*

The urea synthesis liquor from a urea synthesis which has been carried out at 185° C. under a pressure of 280 atmospheres, using $NH_3$ and $CO_2$ in the ratio of 5:1 mol, is rectified under a pressure of 17 kg./cm.² in the high pressure rectification tower 32, whereby 121.4 parts of excess $NH_3$ containing a slight amount of $CO_2$ is obtained at the top of tower 32 and 56.0 parts of mixed gas with 2.9 $NH_3/CO_2$ mol ratio is obtained at the middle part of the tower 32. The distillation of unreacted substances reaches about 86%, based upon $CO_2$.

The liquid withdrawn from the high pressure rectification tower 32, has a $NH_3/CO_2$ mol ratio of 3.07, and is conducted to the concentrator 201, into which a mixed gas having a 5.3 $NH_3/CO_2$ mol ratio is simultaneously blown in at 211 with a temperature of 110° C. and under a presusre of 3.8 kg./cm.². Thereby, the liquid treated in the concentrator 201 does not substantially give off $NH_3$ and $CO_2$ and the carrier gas is consequently accompanied only by the water content in an amount corresponding to what has been formed in the urea reaction system, although the water necessary for recycling the unreacted substances remains in the liquid. The liquid (131.7 parts) discharged at 39 from the concentrator 201 contains 111.7 parts urea, 5.1 parts $NH_3$, 4.3 parts $CO_2$ and 10.6 parts water and is conducted to the crystallizer 40, in which it is cooled to 25° C., forming 100 parts of urea crystals which are separated in the crystal separator 41. The composition of the liquid, prior to and after its treatment in the crystallizing process is based on the phase rule in such a way that co-crystallization of carbamate does not occur.

The mother liquor, which contains 11.7 parts of urea, 5.1 parts of $NH_3$, 4.3 parts $CO_2$ and 10.6 parts water, is passed by means of a plunger pump or turbine pump to tower 33, in which it completely absorbs at 115° C. and 16.7 kg./cm.² at first a trace of $CO_2$ present in the excess $NH_3$ withdrawn from the top of the high pressure rectification tower 32 and then 56.0 parts of mixed gas having a $NH_3/CO_2$ mol ratio of 2.9, which has been withdrawn from the middle part of the high pressure rectification tower 32. The mother liquor has thereby the double function of (a) absorbing the $CO_2$ impurity present in the excess $NH_3$ withdrawn from the top of the high pressure rectification tower 32 and (b) absorbing said mixed gas of $NH_3$ and $CO_2$ withdrawn from the middle part of the same tower 32. The urea solution which has absorbed the unreacted $NH_3$ plus $CO_2$, and contains 11.7 parts urea, 35.2 parts $NH_3$, 30.3 parts $CO_2$ and 15.5 parts water, is recycled to the autoclave 31 through 43.

It will be appreciated that the method of this invention is a total recycle method in which the content of new make-up $NH_3$ plus $CO_2$ may be as a whole tantamount to the amount of urea produced ($NH_3$ being 56.7 parts and $CO_2$ 73.3 parts).

From the gaseous mixture leaving the concentrator 201, the water content is removed in the dehumidification tower 204 and the mixed gas treated in 204 is introduced into concentrator 201 through 206 and reused in tower 201 as a carrier gas. The water removed in the dehumidification step reaches 30 parts, corresponding to the water formed by urea synthetizing.

Figure 4:
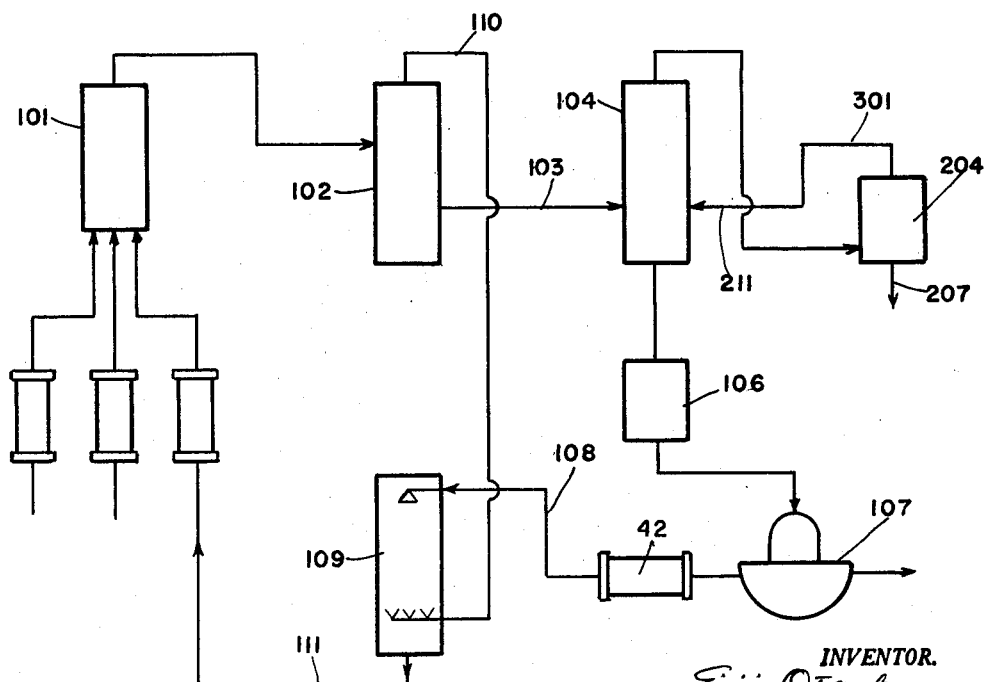
FIGURE 4 shows a somewhat modified embodiment of the system according to FIG. 3, in likewise diagrammatic illustration.

*Example 2.—Procedure in the System According to FIG. 4*

The urea synthesis liquor obtained in autoclave 101 at 200° C. and 210 atmospheres, using 2.6 mols of $NH_3$ for one mol of $CO_2$ is conducted to the high pressure distillation tower 102, in which it is distilled at 145° C. and 17 kg./cm.², whereby 85% of the unreacted substances (based on $CO_2$) are distilled off.

The exit liquor from high pressure distillation tower 102 is conducted through 103 to the concentrator 104, into which at 301 $NH_3$ is blown at 115° C. under 6 kg./cm.² Thereby the $NH_3$ gas is accompanied solely by water, without substantially distilling off $NH_3$ plus $CO_2$ from the liquid present in concentrator 104, so that this liquid is concentrated.

The liquid discharged from concentrator 104 at 105, contains 148 parts urea, 20.2 parts $NH_3$, 16.5 parts $CO_2$ and 32.5 parts water. This liquid is cooled in the crystallizer 106 to 34° C. whereby the urea crystallizes. 100 parts of the crystallized urea is separated in the separator 107.

The mother liquor removed from the urea crystals contains 48.0 parts urea, 20.2 parts $NH_3$, 16.5 parts $CO_2$ and 32.5 parts water, and is passed by means of a suitable pump 42 through 108 to the absorption tower 109, in which it is caused to absorb the gaseous mixture introduced into tower 109 through 110 and containing 115.8 parts $NH_3$, 93.5 parts $CO_2$, and 21.0 parts water at 115° C. under a pressure of 16.5 kg./cm.²

The 347.5 parts of mother liquor which have completely absorbed the unreacted $NH_3$ and $CO_2$ are recycled through 111 to the autoclave 101, whereby the make-up $NH_3$ and $CO_2$ are 56.7 parts and 73.3 parts, respectively. Thus, the total recycling can be performed in form of liquid phase with extremely little solvent.

In other respects the system shown in FIG. 4 is operated substantially in the same manner as described above in connexion with FIG. 3 in the above Example 1.

It will be understood from the above that this invention is not limited to the specific conditions, steps, structures and other details specifically described above and illustrated in the drawings and can be carried out with various modifications without departing from the scope of the invention as defined in the appended claims.

What is claimed is:

1. In the method for treating urea synthesis effluent liquor formed in a urea synthesis from $NH_3$ and $CO_2$ used in the mol ratio of 1 mol of $CO_2$ for 2–6 mols of $NH_3$, and containing urea and water, to recover from the effluent liquor urea as product and $NH_3$ and $CO_2$ values for reuse in the synthesis, the steps comprising (a) subjecting said urea synthesis liquor to high pressure rectification under 10–30 kg./cm.² in order to distil off a major portion of the excess $NH_3$; (b) washing $NH_3$ discharged from the rectification step to remove $CO_2$ with mother liquor of the urea synthesis product and liquefying the $NH_3$ thus freed from $CO_2$ for reuse in the urea synthesis in the form of liquid $NH_3$; (c) treating the urea synthesis liquor obtained in step (a) in a concentration step at elevated temperature and superatmospheric pressure with a carrier gas selected from the group consisting of $NH_3$, mixture of $NH_3$ plus $CO_2$, and $CO_2$, in order to remove water from this synthesis liquor without substantial removal of $NH_3$ and $CO_2$ present in said liquor; (d) treating said carrier gas and water resulting from step (c) by dehumidification in order to remove therefrom substantially water only and reusing said dehumidified gas in step (c); (e) cooling the solution resulting from step (c) in order to separate urea therefrom by crystallization, with simultaneous formation of mother liquor; and (f) passing the mother liquor thus obtained to the urea synthesis, after using it for absorption of $CO_2$ from excess $NH_3$ obtained by said high pressure rectification.

2. In the method for treating urea synthesis effluent liquor formed in a urea synthesis from $NH_3$ and $CO_2$ used in the mol ratio of 1 mol of $CO_2$ for 3–6 mols of $NH_3$, and containing urea and water, to recover from the effluent liquor urea as product and $NH_3$ and $CO_2$ values for reuse in the synthesis, the step comprising (a) subjecting said urea synthesis liquor to high pressure rectificaiton under 10–30 kg./cm.² in order to distil off a major portion of the excess $NH_3$ at the top of the rectification zone and to simultaneously distil off a major portion of the residual unreacted $NH_3$ and $CO_2$ from a point in the middle part of the rectification zone; (b) washing $NH_3$ discharged at the top of the rectification zone with mother liquor of the urea synthesis product in order to remove $CO_2$ from said $NH_3$, liquefying the $NH_3$ thus freed from $CO_2$ for reuse in the urea synthesis in the form of liquid $NH_3$; (c) treating the urea synthesis liquor obtained in step (a) in a concentration step at elevated temperature and super-atmospheric pressure with a carrier gas selected from the group consisting of $NH_3$, mixture of $NH_3$ and $CO_2$, and $CO_2$ to remove water from this synthesis liquor without substantial removal of $NH_3$ and $CO_2$ present in said liquor; (d) treating the $NH_3$ gas and water resulting from step (c) by dehumidification in order to remove therefrom substantially water only and reusing the dehumidified carrier gas in step (c); (e) cooling the solution resulting from step (c) in order to separate urea therefrom by crystallization, with simultaneous formation of mother liquor; and (f) passing the mother liquor thus obtained to the urea synthesis, after using it for absorption of $CO_2$ from excess $NH_3$ obtained by said high pressure rectification.

3. In the method for treating urea synthesis effluent liquor formed in a urea synthesis from $NH_3$ and $CO_2$ used in the mol ratio of 1 mol of $CO_2$ for 2–3 mols of $NH_3$, and containing urea and water, to recover from the effluent liquor urea as product and $NH_3$ and $CO_2$ values for reuse in the synthesis, the steps comprising (a) subjecting said urea synthesis liquor to high pressure distillation in order to distil off a major portion of the $NH_3$ and $CO_2$ at the top of the distillation zone; (b) subjecting said synthesis liquor freed from said major portion of $NH_3$ and $CO_2$ at elevated temperature and super-atmospheric pressure to a concentration step under pressure with a carrier gas selected from the group consisting of $NH_3$, mixture of $NH_3$ and $CO_2$, and $CO_2$, wherein a substantial amount of the water content is distilled off without distilling off $NH_3$ and $CO_2$ present in said synthesis liquor; (c) introducing the gaseous ammonia discharged from said concentration step into a dehumidification step wherein substantially only water is removed and the dehumidified carrier gas is reused in step (b); (d) cooling the synthesis liquor discharged from step (b) in order to form urea crystals and mother liquor; (e) separating the mother liquor thus formed from the urea crystals and using it for absorbing $NH_3$ and $CO_2$ obtained by high pressure distillation in step (a), and passing the resulting liquor to the urea synthesis.

4. A method as claimed in claim 1, in which the distilled-off major portion of the residual unreacted $NH_3$ and $CO_2$ has a mol ratio 2.5–3.5 of $NH_3/CO_2$.

5. A method of urea synthesis as claimed in claim 2, in which the carrier gas used in step (c) is a mixture of $NH_3$ and $CO_2$.

6. A method of urea synthesis as claimed in claim 3, in which the carrier gas used in step (c) is a mixture of $NH_3$ and $CO_2$.

7. A method of urea synthesis as claimed in claim 2, in which the carrier gas used in step (c) is $CO_2$.

8. A method of urea synthesis as claimed in claim 3, in which the carrier gas used in step (c) is $CO_2$.

9. A method of urea synthesis as claimed in claim 1, in which water is distilled off from the synthesis liquor in step (c) at a temperature of 70–150° C. under a pressure of 1–8 kg./cm.².

10. A method of urea synthesis as claimed in claim 2, where the distillation rate in the high pressure rectification zone is over 65% on the basis of $CO_2$.

11. A method of urea synthesis as claimed in claim 3, where the distillation rate in the high pressure rectification zone is over 65% on the basis of $CO_2$.

12. A method of urea synthesis as claimed in claim 2, in which the carrier gas used in step (c) is ammonia.

13. A method of urea synthesis as claimed in claim 3, in which the carrier gas used in step (c) is ammonia.

14. A method according to claim 1, wherein the high pressure rectification a major portion of the excess $NH_3$ is distilled off the top of the rectification column and a major portion of the residual unreacted $NH_3$ and $CO_2$ is distilled off in the middle part of the rectification column and the mother liquor is used for absorbing $CO_2$ from excess $NH_3$ distilled off the top of the column and is thereafter used for absorbing $NH_3$ and $CO_2$ distilled off from the middle of the rectification column.

15. In a method for treating urea synthesis effluent formed by a urea synthesis employing stoichiometrically excess $NH_3$ over $CO_2$, the steps comprising a rectifying step wherein the urea synthesis effluent is introduced into a rectification zone maintained at 10–30 kg./cm.$^2$, 90–110° C. at the top and 130–160° C. at the bottom, there is withdrawn at the top $NH_3$ containing a trace of $CO_2$, there is withdrawn in the middle part a gaseous mixture of $NH_3$ and $CO_2$ having an $NH_3/CO_2$ mol ratio of 2.5–3.5, and there is withdrawn at the bottom a solution comprising urea, ammonium carbamate and water; and a concentrating step wherein the solution withdrawn from the bottom of the rectification zone is introduced into a concentration zone maintained at 1–8 kg./cm.$^2$ in 75–150° C., there is withdrawn at the top of the concentration zone substantially the whole amount of water produced by the urea synthesis by blowing into said solution a carier gas selected from the group consisting of $NH_3$, mixture of $NH_3$ and $CO_2$, and $CO_2$, and there is withdrawn at the bottom an aqueous solution comprising urea, ammonium carbamate and water; a crystallizing step wherein in the aqueous solution withdrawn from the concentration zone is introduced into a crystallizing zone maintained at 20–40° C., there is deposited crystalline urea; and a separating step wherein an aqueous solution comprising urea, ammonium carbamate, and water is separated from the crystalline urea-containing solution; an absorption step wherein said aqueous solution separated in the separating step is compressed to 10–40 kg./cm.$^2$ and is introduced to the top of an absorption zone maintained at 10–40 kg./cm.$^2$ and 80–140° C. and wherin the ammonia withdrawn from the top of the rectifying zone is introduced near the top, and the gaseous mixture withdrawn from the middle part of the rectifying zone is introduced near the bottom, there is withdrawn at the top ammonia substantially free of $CO_2$, and there is withdrawn at the bottom a solution comprising urea, ammonium carbamate, and water, and condensing said ammonia substantially free of $CO_2$ which is withdrawn from the absorption zone and conducting it to the urea synthesis, and conducting the solution withdrawn from the absorption zone to the urea synthesis.

16. In the method for treating the urea synthesis effluent formed by a urea synthesis employing stoichiometrically excess $NH_3$ over $CO_2$, the improvement in separating unreacted gas from said effluent which comprises introducing said effluent into the rectifying tower maintained at 10–30 kg./cm.$^2$, 90–110° C. at the top and 130–160° C. at the bottom, withdrawing at the top $NH_3$ containing a trace of $CO_2$, withdrawing at the middle part a gaseous mixture of $NH_3$ and $CO_2$ having a $NH_3/CO_2$ mol ratio of 2.5–3.5, and withdrawing at the bottom a solution comprising urea, ammonium carbamate and water.

17. In the method for treating urea synthesis effluent liquor formed in a urea synthesis employing stoichiometrically excess of $NH_3$ over $CO_2$ and containing urea and water, to recover from the effluent liquor urea as product and $NH_3$ and $CO_2$ values for reuse in the synthesis, wherein the synthesis effluent liquor is treated to separate unreacted $NH_3$ therefrom and the resulting liquor is further treated for the recovery of urea and $NH_3$ and $CO_2$ values, the improvement which comprises separating water formed in the urea synthesis reaction from said resulting liquor by passing a carrier gas selected from the group consisting of $NH_3$, a mixture of $NH_3$ and $CO_2$, and $CO_2$ through said resulting solution while maintaining it at a pressure of 1–8 kg./cm.$^2$ and 70–150° C., whereby a concentrated urea solution is formed, and separating urea from the concentrated solution and passing the mother liquor to the urea synthesis.

References Cited in the file of this patent

UNITED STATES PATENTS

| | | |
|---|---|---|
| 2,056,283 | Lawrence et al. | Oct. 6, 1936 |
| 2,017,588 | De Ropp et al. | Oct. 15, 1955 |
| 2,916,516 | Michelitsch | Dec. 8, 1959 |

OTHER REFERENCES

Tonn: Chemical Engineering, vol. 62 (October 1955), pp. 186–190 (1955).